United States Patent
Sun

(10) Patent No.: US 11,206,360 B2
(45) Date of Patent: Dec. 21, 2021

(54) EXPOSURE CONTROL METHOD FOR OBTAINING HDR IMAGE, RELATED EXPOSURE CONTROL DEVICE AND ELECTRONIC DEVICE

(71) Applicant: Guangdong Oppo Mobile Telecommunications Corp., Ltd., Guangdong (CN)

(72) Inventor: Jianbo Sun, Guangdong (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 0 days.

(21) Appl. No.: 16/561,806

(22) Filed: Sep. 5, 2019

(65) Prior Publication Data

US 2020/0007736 A1 Jan. 2, 2020

Related U.S. Application Data

(63) Continuation of application No. PCT/CN2018/075491, filed on Feb. 6, 2018.

(30) Foreign Application Priority Data

Mar. 9, 2017 (CN) .......................... 201710137930.5

(51) Int. Cl.
*H04N 5/235* (2006.01)
*G06T 7/55* (2017.01)
(Continued)

(52) U.S. Cl.
CPC ............. *H04N 5/2355* (2013.01); *G06T 5/50* (2013.01); *G06T 7/55* (2017.01); *H04N 5/2351* (2013.01);
(Continued)

(58) Field of Classification Search
CPC ........... H04N 5/2355; H04N 5/232125; H04N 5/2351; H04N 5/2353; G06T 7/55; G06T 5/50
See application file for complete search history.

(56) References Cited

U.S. PATENT DOCUMENTS

2006/0114333 A1 6/2006 Gokturk et al.
2008/0094486 A1 4/2008 Fuh
(Continued)

FOREIGN PATENT DOCUMENTS

CN 1945539 A 4/2007
CN 101621629 A 1/2010
(Continued)

OTHER PUBLICATIONS

European Search Report dated Nov. 25, 2019 from International Application No. PCT/CN2018/075491.
(Continued)

*Primary Examiner* — Antoinette T Spinks
(74) *Attorney, Agent, or Firm* — Young Basile Hanlon & MacFarlane, P.C.

(57) ABSTRACT

Disclosed in the present disclosure are an exposure control method, an exposure control device and an electronic device. The exposure control method includes the following. Scene data is processed to obtain a foreground part of a cached main image. A reference exposure is determined according to brightness information of the foreground part. A first exposure for a first image and a second exposure for a second image are determined according to the reference exposure. An imaging device is controlled to expose according to the reference exposure, the first exposure and the second exposure.

18 Claims, 12 Drawing Sheets

(51) Int. Cl.
    *H04N 5/232* (2006.01)
    *G06T 5/50* (2006.01)
(52) U.S. Cl.
    CPC ..... *H04N 5/2353* (2013.01); *H04N 5/232125* (2018.08)

(56) References Cited

U.S. PATENT DOCUMENTS

| | | | |
|---|---|---|---|
| 2009/0310955 A1* | 12/2009 | Lien | H04N 5/2351 396/153 |
| 2010/0309332 A1* | 12/2010 | Ueda | H04N 5/35536 348/229.1 |
| 2011/0150451 A1* | 6/2011 | Kubota | G03B 15/05 396/159 |
| 2011/0211732 A1 | 9/2011 | Rapaport | |
| 2013/0205057 A1 | 8/2013 | Sasaoka | |
| 2013/0300895 A1* | 11/2013 | Kawarada | H04N 5/232123 348/229.1 |
| 2014/0022408 A1 | 1/2014 | Nashizawa | |
| 2016/0191776 A1 | 6/2016 | Shroff | |
| 2016/0191896 A1 | 6/2016 | Basche et al. | |
| 2021/0270971 A1* | 9/2021 | Inaba | G01S 17/08 |

FOREIGN PATENT DOCUMENTS

| | | |
|---|---|---|
| CN | 101909150 A | 12/2010 |
| CN | 103248828 A | 8/2013 |
| CN | 103581565 A | 2/2014 |
| CN | 103973690 A | 8/2014 |
| CN | 103973691 A | 8/2014 |
| CN | 104333710 A | 2/2015 |
| CN | 104917973 A | 9/2015 |
| CN | 105100637 A | 11/2015 |
| CN | 106851123 A | 6/2017 |

OTHER PUBLICATIONS

Office Action with English Translation for CN Application 201710136008.4 dated May 29, 2019.
Office Action with English Translation for CN Application 201710137930.5 dated Apr. 2, 2019.
International Search Report with English Translation for PCT/CN2018/075491 dated May 4, 2018.
India Examination Report for IN Application 201917036107 dated Feb. 2, 2021. (5 pages).

* cited by examiner

EXPOSURE CONTROL METHOD FOR OBTAINING HDR IMAGE, RELATED EXPOSURE CONTROL DEVICE AND ELECTRONIC DEVICE

CROSS-REFERENCE TO RELATED APPLICATION(S)

This application is a continuation application of International Application No. PCT/CN2018/075491, filed on Feb. 6, 2018, which claims priority to Chinese Patent Application No. 201710137930.5, filed on Mar. 9, 2017, the entire contents of both of which are incorporated herein by reference.

TECHNICAL FIELD

The present disclosure relates to a field of imaging technologies, and more particular to an exposure control method, an exposure control device, and a related electronic device.

BACKGROUND

In a method for obtaining a wide dynamic range image, exposure time for an underexposed image and an overexposed image may be generally fixed. When the exposure time for the underexposed image and the overexposed image is not appropriate, an image quality of the wide dynamic range image may be deteriorated.

SUMMARY

Implementations of the present disclosure provide an exposure control method, an exposure control device and a related electronic device.

An exposure control method for controlling an imaging device to collect scene data is provided. The scene data includes a cached master image. The exposure control method includes:

processing the scene data to obtain a foreground part of the cached master image;

determining a reference exposure based on brightness information of the foreground part;

determining a first exposure for a first image and a second exposure for a second image based on the reference exposure, the first exposure for the first image being less than the reference exposure and the second exposure for the second image being greater than the reference exposure; and controlling the imaging device to expose based on the reference exposure, the first exposure and the second exposure.

An exposure control device based on depth for controlling an imaging device to capture scene data is provided. The scene data includes a cached master image. The exposure control device includes a processing module, a first determining module, a second determining module and a control module.

The processing module is configured to process the scene data to obtain a foreground part of the cached master image.

The first determining module is configured to determine a reference exposure based on brightness information of the foreground part.

The second determining module is configured to determine a first exposure for a first image and a second exposure for a second image based on the reference exposure, the first exposure for the first image being less than the reference exposure and the second exposure for the second image being greater than the reference image.

The control module is configured to control the imaging device to expose based on the reference exposure, the first exposure and the second exposure.

An electronic device including an imaging device and an exposure control device is provided.

Additional aspects and advantages of the present disclosure will be provided in description below. A part of the present disclosure will become apparent, or may be practiced from the present disclosure.

BRIEF DESCRIPTION OF THE DRAWINGS

The above and/or additional aspects and advantages of the present disclosure may become apparent and readily to be understood from descriptions made to embodiments in combination with drawings, in which.

DETAILED DESCRIPTION

Figure 1:
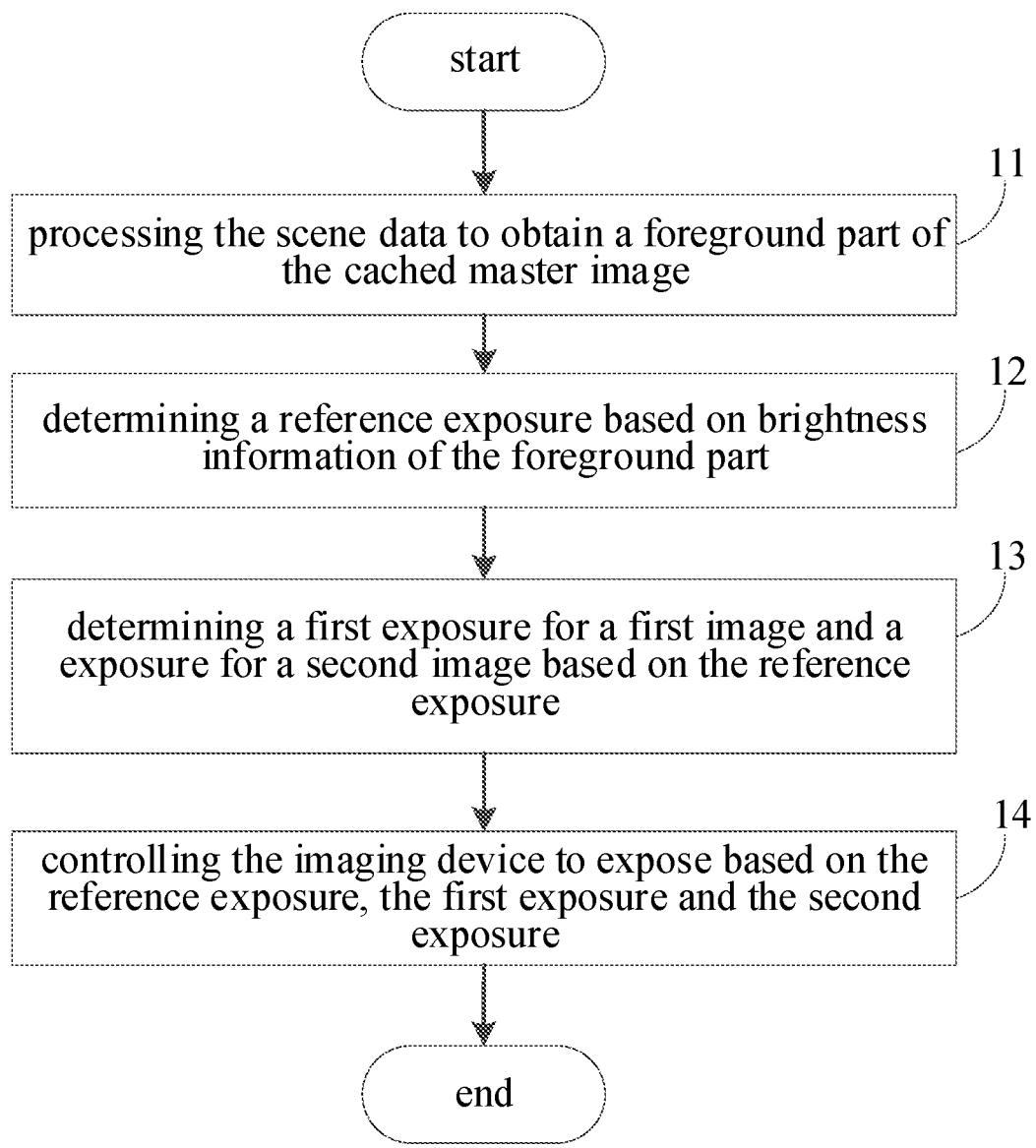
FIG. 1 is a flowchart illustrating an exposure control method according to implementations of the present disclosure.

Implementations of the present application will be described in detail below. Examples of the implementations are illustrated in drawings, in which throughout the present disclosure, same or similar reference numerals are used to represent same or similar elements or elements having same or similar functions. The implementations described below with reference to the accompanying drawings are intended to be illustrative and to explain the present disclosure, and are not construed as limiting.

As illustrated in FIG. 1, an exposure control method based on depth according to implementations of the present disclosure may be described. The scene data may include a cached master image. The exposure control method may include the following.

At block 11, the scene data is processed to obtain a foreground part of the cached master image.

At block 12, a reference exposure is determined based on brightness information of the foreground part.

At block 13, a first exposure for a first image and a second exposure for a second image are determined based on the reference exposure. The first exposure for the first image is less than the reference exposure and the second exposure for the second image is greater than the reference exposure.

At block 14, an imaging device is controlled to expose based on the reference exposure, the first exposure for the first image and the second exposure for the second image.

Figure 2:
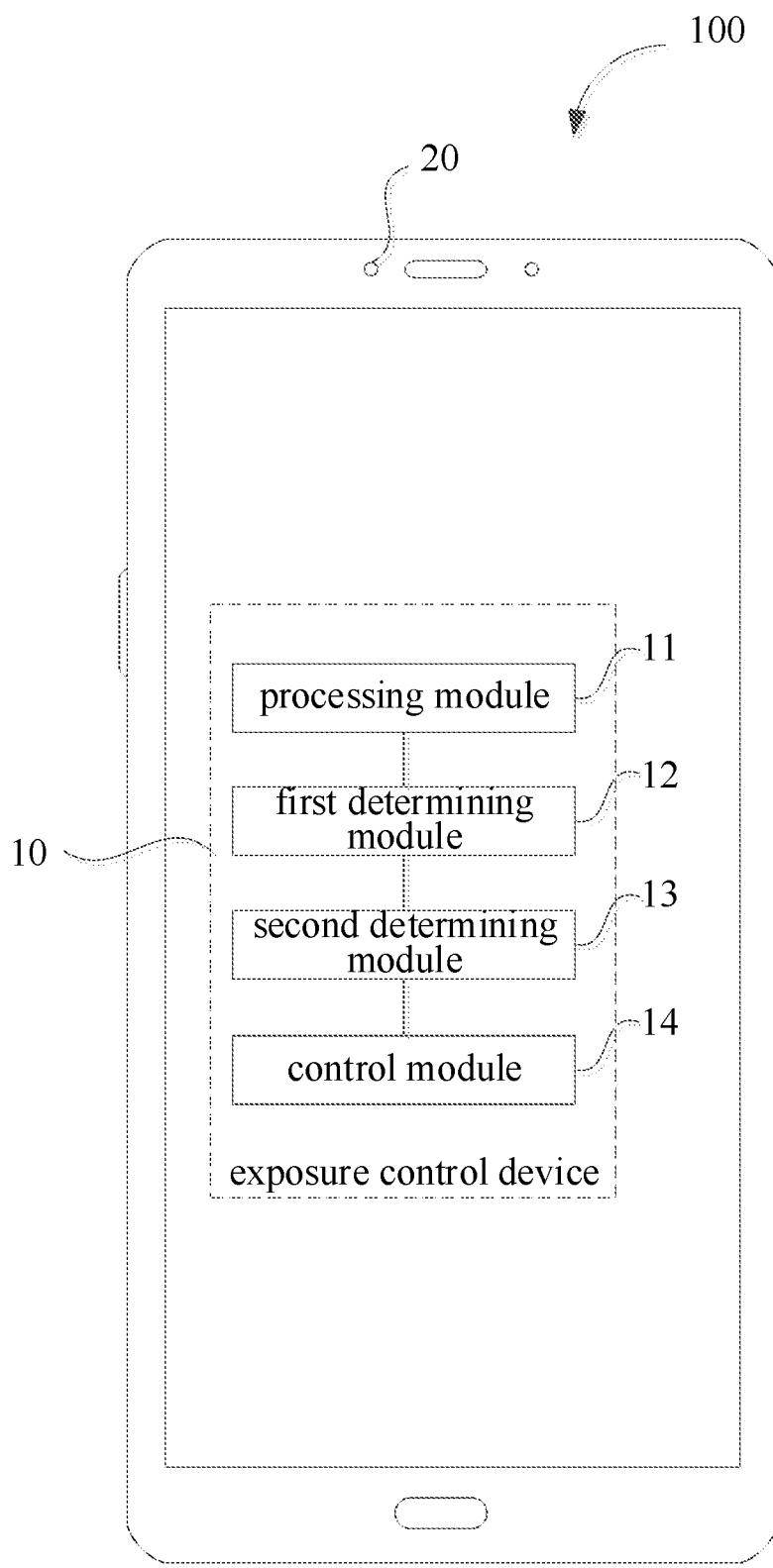
FIG. 2 is a plan view diagram illustrating an electronic device according to implementations of the present disclosure.

As illustrated in FIG. 2, an exposure control device 10 based on depth according to implementations of the present disclosure is described. The exposure control device 10 may be configured to execute the above exposure control method. In detail, the exposure control device 10 may be configured to control the imaging device 20 to collect the scene data. The scene data may include the cached master image. The exposure control device 10 may include a processing module 11, a first determining module 12, a second determining module 13 and a control module 14. The processing module 11 may be configured to process the scene data to obtain a foreground part of a cached master image. The first determining module 12 may be configured to determine a reference exposure based on brightness information of the foreground part. The second determining module 13 may be configured to determine a first exposure for a first image and a second exposure for a second image based on the reference exposure, the first exposure for the first image is less than the reference exposure and the second exposure for the second image is greater than the reference exposure. The control module 14 may be configured to control an imaging device 20 to expose based on the reference exposure, the first exposure for the first image and the second exposure for the second image.

In other words, the exposure control method according to implementations of the present disclosure may be realized by the exposure control device 10 according to implementations of the present disclosure. The block 11 may be implemented by the processing module 11. The block 12 may be implemented by the first determining module 12. The block 13 may be implemented by the second determining module 13. The block 14 may be implemented by the control module 14.

In some implementations, the exposure control device 10 according to implementations of the present disclosure may be integrated in the electronic device 100 according to implementations of the present disclosure. In other words, the electronic device 100 according to implementations of the present disclosure may include the exposure control device 10 according to implementations of the present disclosure. In addition, the electronic device 100 according to implementations of the present disclosure may further include the imaging device 20. The imaging device 20 may be electrically connected to the exposure control device 10.

The exposure control method, the exposure control device 10, and the electronic device 100 according to implementations of the present disclosure may determine the foreground part as a main object of the image based on depth information. The reference exposure may be determined based on brightness information of the main object. The first exposure for the first image and the second exposure for the second image may be determined based on the reference exposure. The imaging device may be controlled to expose based on the reference exposure, the first exposure for the first image and the second exposure for the second image, to obtain many images. Therefore, a wide dynamic range image having a clear main body and an appropriate dynamic range may be obtained with a method for processing an image.

It may be understood that, the first image may be a dark image while the second image may be a bright image. The reference exposure may be an exposure of a normally exposed image. Clarity of the foreground part (i.e. the main object) may be improved by obtaining the reference exposure based on the brightness information of the foreground part. Therefore, the normally exposed image may have a good image quality.

In some implementations, the electronic device 100 may be a phone or a tablet computer. In some implementations, the electronic device 100 is a phone.

In some implementations, the imaging device 20 may be a front camera and/or a rear camera, which is not limited thereto. In some implementations, the imaging device 20 is a front camera.

Figure 3:
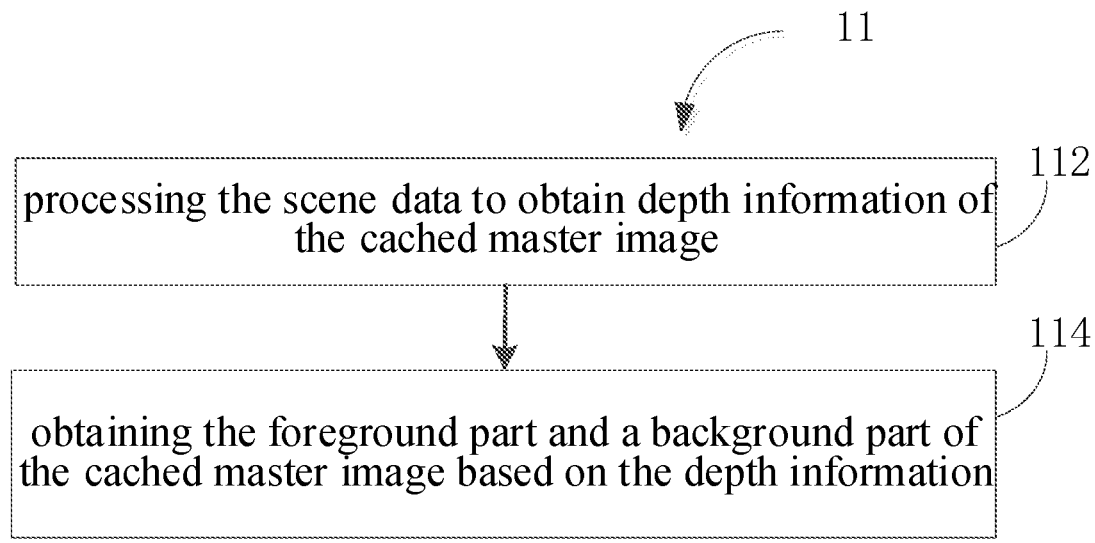
FIG. 3 is a flowchart illustrating an exposure control method according to some implementations of the present disclosure.

As illustrated in FIG. 3, in some implementations, the block 11 may include the following.

At block 112, the scene data is processed to obtain depth information of the cached master image.

At block 114, the foreground part of the cached master image may be obtained based on the depth information.

Figure 4:
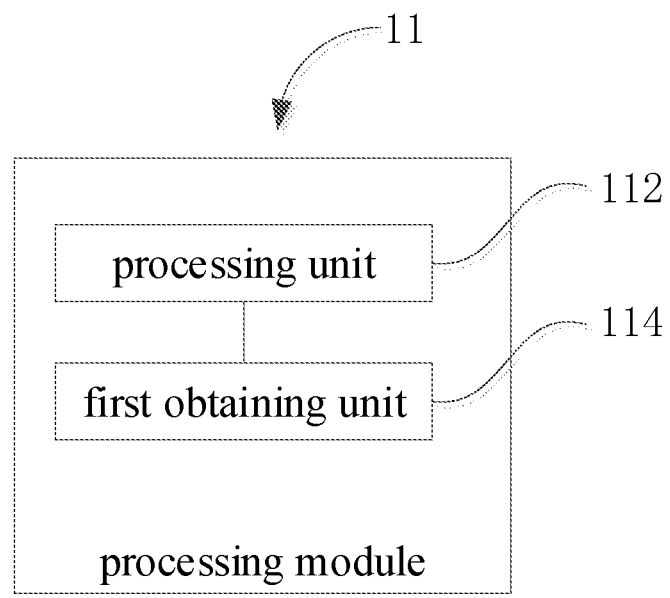
FIG. 4 is a block diagram illustrating a processing module of an exposure control device according to some implementations of the present disclosure.

As illustrated in FIG. 4, in some implementations, the processing module 11 may include a processing unit 112 and a first obtaining unit 114. The processing unit 112 may be configured to process the scene data to obtain depth information of the cached master image. The first obtaining unit 114 may be configured to obtain the foreground part of the cached master image based on the depth image.

In other words, the block 112 may be implemented by the processing unit 112. The block 114 may be implemented by the first obtaining unit 114.

Therefore, the foreground part of the cached master image may be obtained based on the depth information.

Figure 5:
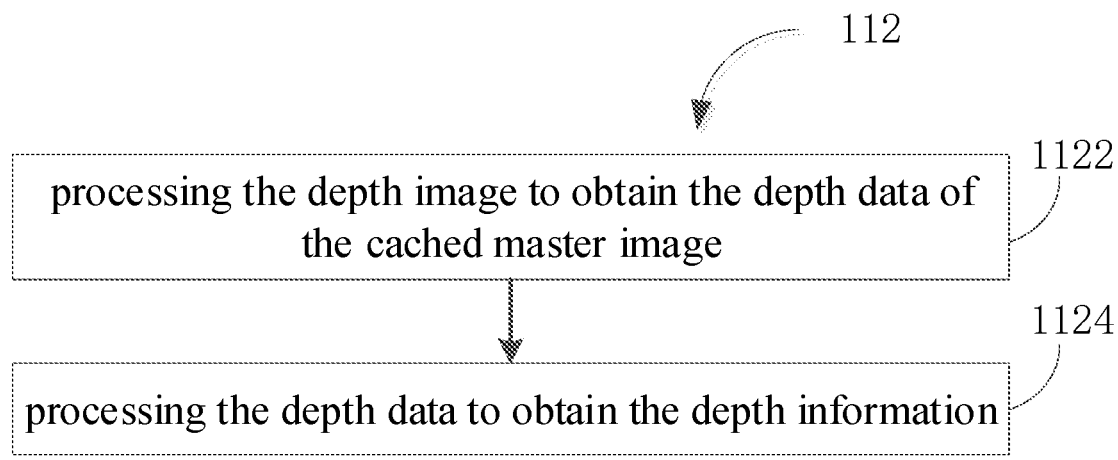
FIG. 5 is a flowchart illustrating an exposure control method according to some implementations of the present disclosure.

As illustrated in FIG. 5, in some implementations, the scene data may include a depth image corresponding to the cached master image. The block 112 may include the following.

At block 1122, the depth image is processed to obtain depth data of the cached master image.

At block 1124, the depth data is processed to obtain the depth information.

Figure 6:
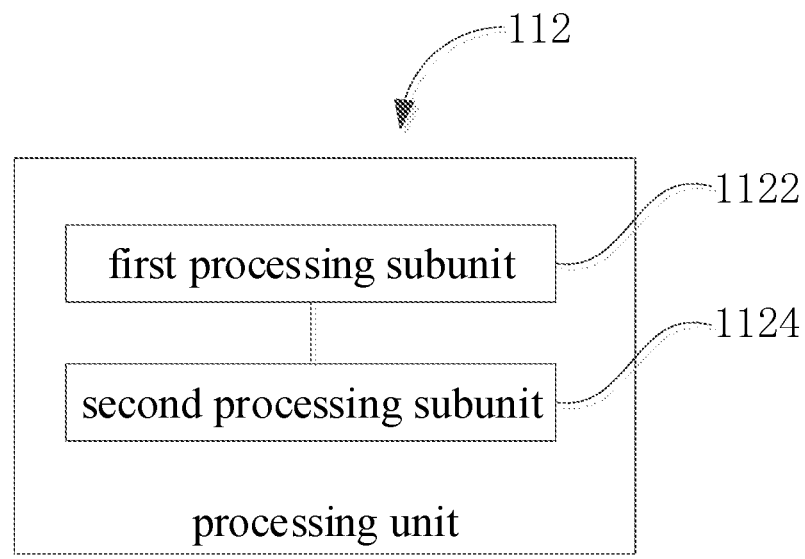
FIG. 6 is a block diagram illustrating a processing unit according to some implementations of the present disclosure.

As illustrated in FIG. 6, in some implementations, the scene data may include a depth image corresponding to the cached master image. The processing unit 112 may include a first processing subunit 1122 and a second processing subunit 1124. The first processing subunit 1122 may be configured to process the depth image to obtain depth data of the cached master image. The second processing subunit 1124 may be configured to process the depth data to obtain the depth information.

In other words, the block 1122 may be implemented by the first processing subunit 1122. The block 1124 may be implemented by the second processing subunit 1124.

Therefore, the depth information of the cached master image may be obtained using the depth image.

It may be understood that, the cached master image may be an RGB (Red-Green-Blue) color image. The depth image may include a large amount of depth data, including depth information corresponding to various persons and objects in the scene. The depth information may include a value of the depth and/or a range of the depth. Since color information of the cached master image may have a one-by-one correspondence with the depth information of the depth image, the depth information of the cached master image may be obtained.

In some implementations, a manner of obtaining the depth image corresponding to the cached master image may include a manner of obtaining the depth image using a depth measurement method with structural light and a manner of obtaining the depth image by a time of flight (TOF) depth camera.

When the depth image is obtained with the depth measurement method with structural light, the imaging device 20 may include a camera and a projector.

It may be understood that, the depth measurement method with structural light is to use a light projector to project the structural light having a certain pattern on a surface of the object, such that a three-dimensional stripe image modulated by the shape of the object may be formed on the surface of the object. The three-dimensional stripe image may be detected by a camera to obtain a two-dimensional stripe distortion image. A degree of the stripe distortion depends on a relative position relation between the projector and the camera, a surface profile and a surface height of the object. A displacement along the stripe is proportional to the surface height of the object. A kink of strips may indicate a change in the plane surface and a discontinuity of the strips may indicate a physical gap of the surface. When the relative position relation between the projector and the camera is fixed, the three-dimensional profile of the object surface may be represented by coordinates of the distorted two-dimensional stripe image. Therefore, the depth information may be obtained. The depth measurement method with the structural light has a relatively high resolution and a relatively high measurement accuracy.

When the depth image is obtained using the TOF depth camera, the imaging device 20 may include a TOF depth camera.

It may be understood that, the TOF depth camera may be configured to record a change in phase of modulated infrared light emitted from a light emitter and a change in phase of infrared light reflected by the object. In a range of wavelengths, based on the light speed, a depth distance of the whole scene may be obtained in real time. Calculation of the depth information by the TOF depth camera is not affected by a surface gray level and a surface feature of the object to be photographed. In addition, the depth information may be calculated quickly with high real-time performance.

Figure 7:
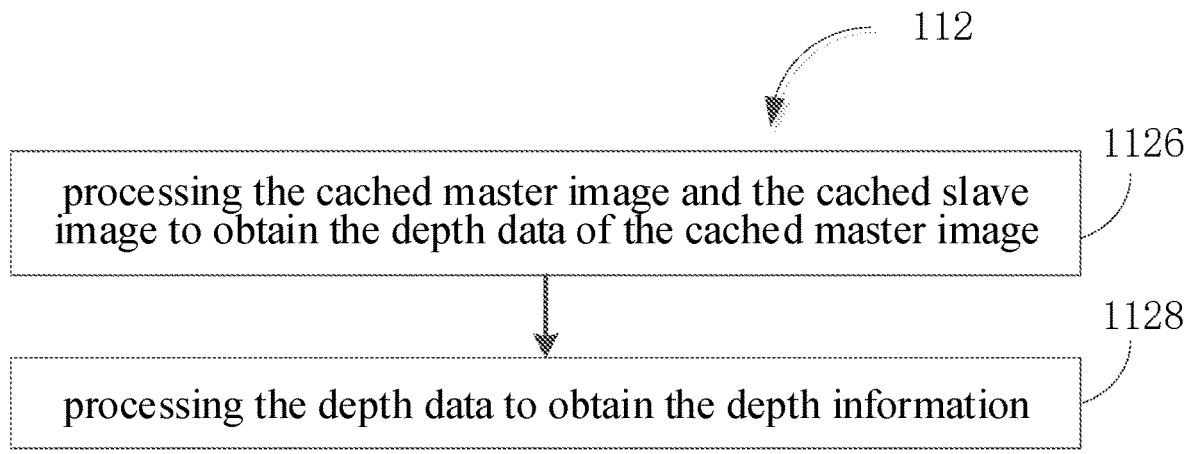
FIG. 7 is a flowchart illustrating an exposure control method according to some implementations of the present disclosure.

As illustrated in FIG. 7, in some implementations, the scene data may include a cached slave image corresponding to the cached master image. The block 112 may include the following.

At block 1126, the scene master image and the cached slave image are processed to obtain the depth data of the cached master image.

At block 1128, the depth data is processed to obtain the depth information.

Figure 8:
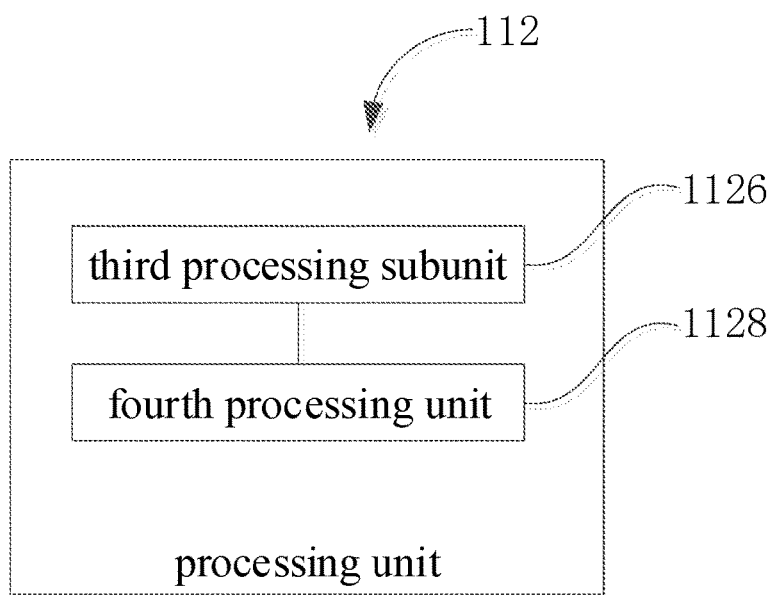
FIG. 8 is another block diagram illustrating a processing unit according to some implementations of the present disclosure.

As illustrated in FIG. 8, in some implementations, the scene data may include the cached slave image corresponding to the cached master image. The processing unit 112 may include a third processing subunit 1126 and a fourth processing subunit 1128. The third processing subunit 1126 may be configured to process the cached master image and the cached slave image to obtain depth data corresponding to the cached master image. The fourth processing subunit 1128 may be configured to process the depth data to obtain the depth information.

In other words, the block 1126 may be implemented by the third processing subunit 1126. The block 1128 may be implemented by the fourth processing subunit 1128.

Therefore, the depth information of the cached master image may be obtained by processing the cached master image and the cached slave image.

In some implementations, the imaging device 20 may include a master camera and a slave camera.

It may be understood that, the depth information may be obtained by a binocular stereo vision distance measurement method, and the scene data may include the cached master image and the cached slave image. The cached master image may be captured by the master camera. The cached slave image may be captured by the slave camera. The binocular stereo vision distance measurement method is to photograph a same object at different positions using two identical cameras to obtain a stereo image of the object, and to calculate disparity value by matching corresponding image points of a pair of stereo images using an algorithm. Therefore, the depth information may be obtained through a triangulation method. The depth information of cached master image may be obtained by matching the pair of stereo images including the cached master image and the cached slave image.

Figure 9:
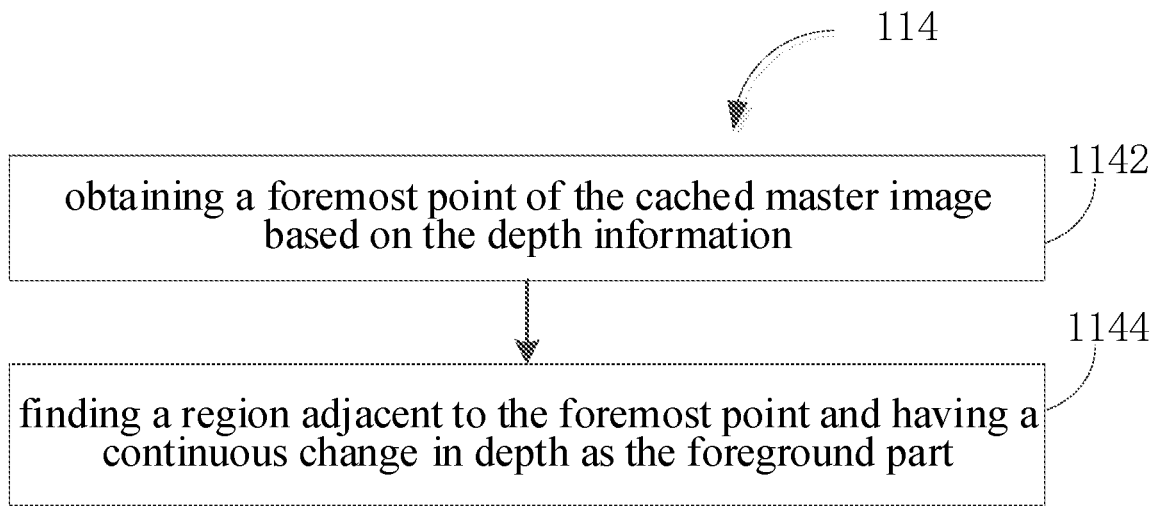
FIG. 9 is a flowchart illustrating an exposure control method according to some implementations of the present disclosure.

As illustrated in FIG. 9, in some implementations, the block 114 may include the following.

At block 1142, a foremost point of the cached master image may be obtained based on the depth information.

At block 1144, a region adjacent to the foremost and having a continuous change in depth to the foremost is found as the foreground part.

Figure 10:
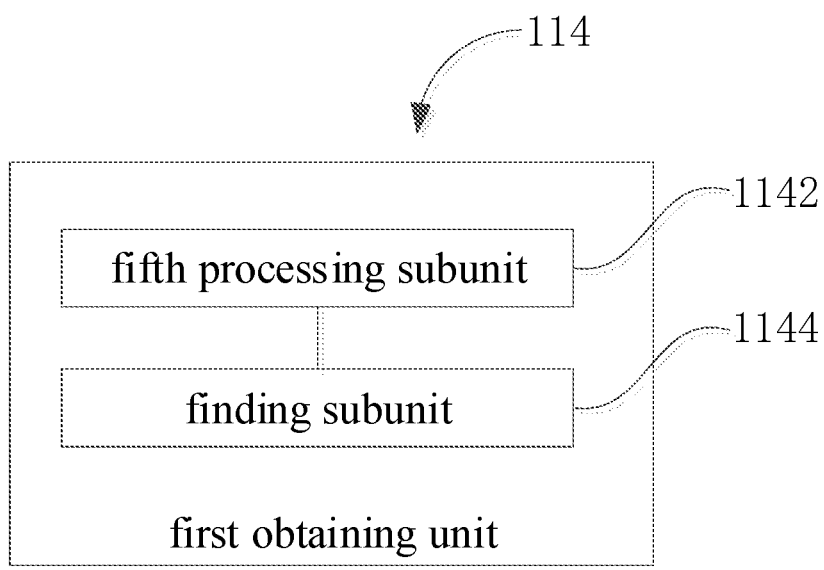
FIG. 10 is a block diagram illustrating a first obtaining unit according to some implementations of the present disclosure.

As illustrated in FIG. 10, in some implementations, the first obtaining unit 114 may include a fifth processing subunit 1142 and a finding subunit 1144. The fifth processing subunit 1142 may be configured to obtain a foremost of the cached master image based on the depth information. The finding subunit 1144 may be configured to find a region adjacent to the foremost and of a continuous change in depth to the foremost as the foreground part.

In other words, the block 1142 may be implemented by the fifth processing subunit 1142. The block 1144 may be implemented by the finding subunit 1144.

Therefore, foreground parts physically related to each other may be obtained in the cached master image. In a practical scene, the foreground parts may be adjacent to each other. The physically related foreground parts may be determined as the main object, such that a relationship of the foreground parts may be intuitively obtained.

In detail, the foremost of the cached master image may be obtained based on the depth information. The foremost may be a start of the foreground part. Extending from the foremost, the region adjacent to the foremost and having the continuous change in depth may be determined. The determined region and the foremost may be determined as the foreground region.

It should be noted that, the foremost refers to a pixel point corresponding to an object having a smallest depth, that is, the pixel point corresponding to the object having a smallest object distance or a smallest distance from the imaging device 20. The term "adjacent" means that two pixel points are adjoined to each other. The term "continuous change in depth" refers to a depth difference between two adjacent pixel points is less than a preset threshold. In other words, two adjacent pixel points having a depth different less than a predetermined threshold are of continuous change in depth.

Figure 11:
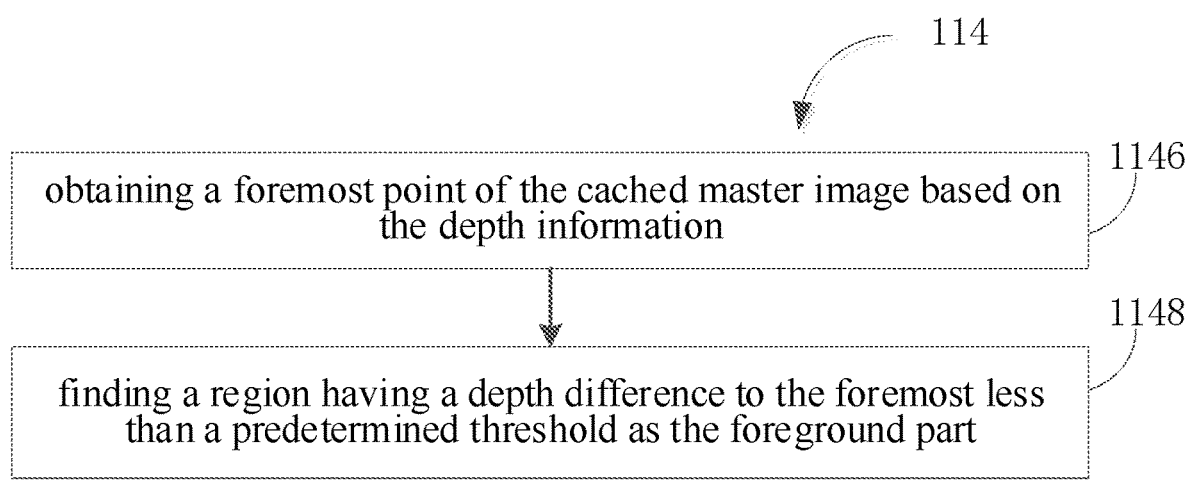
FIG. 11 is a flowchart illustrating an exposure control method according to some implementations of the present disclosure.

As illustrated in FIG. 11, in some implementations, the block 114 may include the following.

At block 1146, a foremost of the cached master image is obtained based on the depth information.

At block 1148, a region having a depth difference to the foremost less than the predetermined threshold is found as the foreground part.

It should be noted that, the depth different between a region and the foremost is less than the predetermined threshold, such that the region is determined as the foreground part.

Therefore, foreground parts logically related to each other may be obtained in the cached master image. In a practical scene, it is possible that the foreground parts are not physically adjacent to each other, but have a certain logical relationship. For example, in a case where an eagle is swooping down to catch a chick, the eagle and the chick are not physically adjacent to each other. However, the eagle and the chick are logically related to each other.

In detail, the foremost of the cached master image may be obtained based on the depth information. The foremost may be a start of the foreground part. Extending from the foremost, a region having a depth difference to the foremost less than the predetermined threshold is obtained. The obtained region and the foremost are determined as the foreground region.

In some implementations, the predetermined threshold may be a value set by a user. Therefore, a range of the foreground part may be determined based on requirements of the user. Therefore, an ideal image may be obtained to realize the image ideal.

In some implementations, the predetermined threshold may be a value determined by the exposure control device 10, which is not limited thereto. The predetermined threshold determined by the exposure control device 10 may be a fixed value stored in an internal memory. In an example, the predetermined threshold may be a value calculated based on depth of the foremost according to different scenes.

In some implementations, the block 13 may include the following.

A region having depth within a preset range is found as the foreground part.

A region other than the foreground part in the cached master image is determined as a background part.

Therefore, the foreground part and the background part having depths within respective appropriated ranges may be determined.

It may be understood that, in some capturing scenes, the foreground part is not a foremost part, instead the foreground part is a part slightly behind the foremost part. For example, when a person sits behind a compute, the computer is in front of the person. Since the person is the main object, a region having the depth within the predetermined range is determined as the foreground part, such that an incorrect selection of the main object may be effectively avoided.

Figure 12:
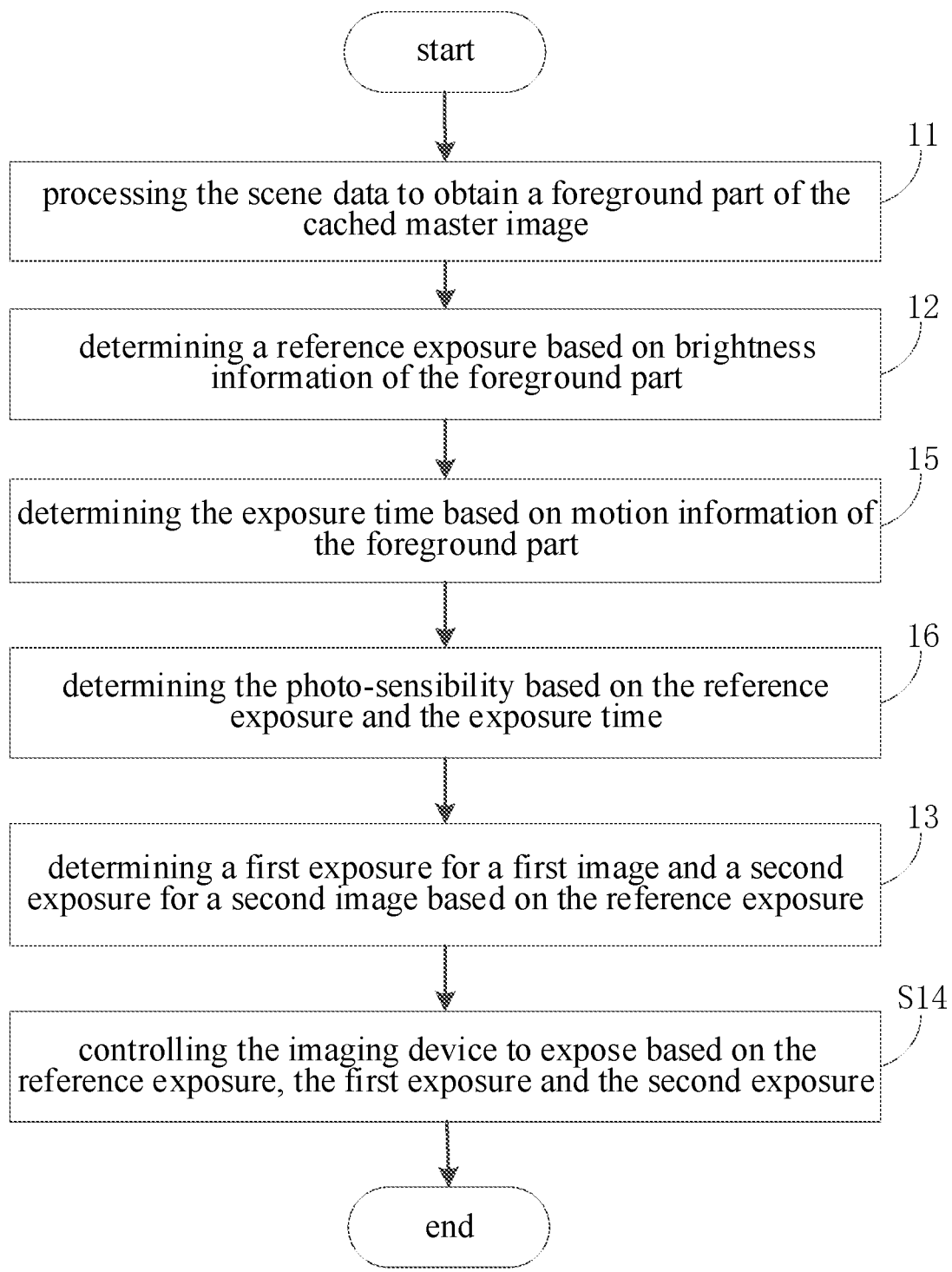
FIG. 12 is a flowchart illustrating an exposure control method according to some implementations of the present disclosure.

As illustrated in FIG. 12, in some implementations, the reference exposure may include an exposure time and a photo-sensibility of the imaging device 20. The exposure control method may include the following.

At block 15, the exposure time is determined based on motion information of the foreground part.

At block 16, a photo-sensibility is determined based on the reference exposure and the exposure time.

Figure 13:
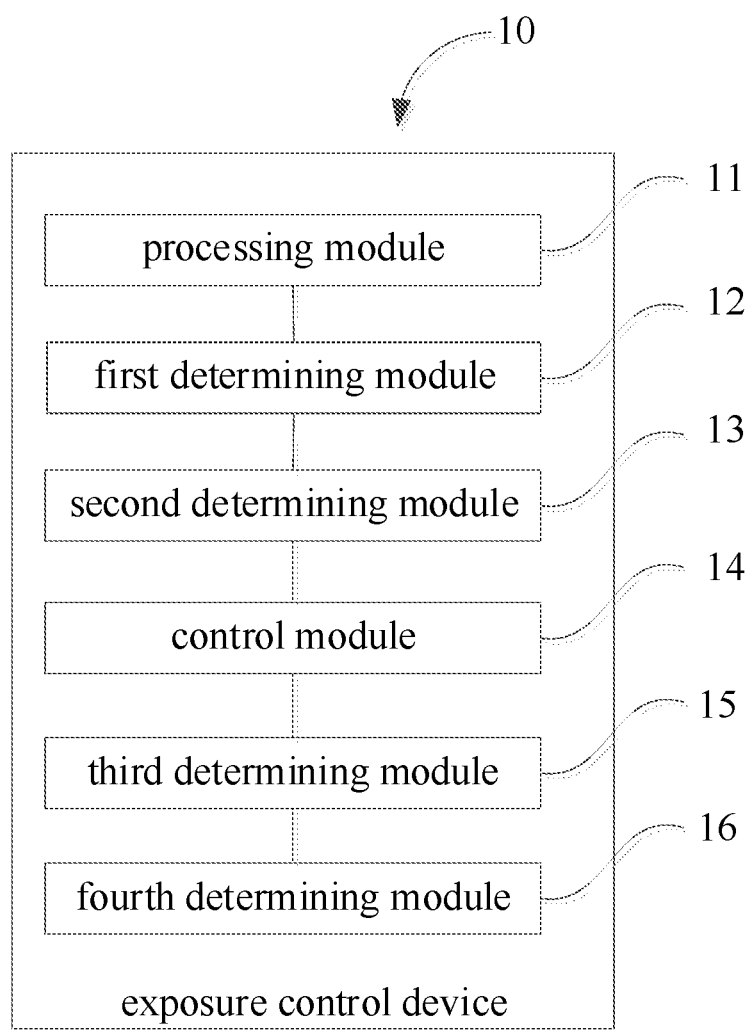
FIG. 13 is a block diagram illustrating an exposure control device according to some implementations of the present disclosure.

As illustrated in FIG. 13, in some implementations, the reference exposure may include the exposure time and the photo-sensibility of the imaging device 20. The exposure control device 10 may include a third determining module 15 and a fourth determining module 16. The third determining module 15 may be configured to determine an exposure time based on motion information of the foreground part. The fourth determining module 16 may be configured to determine the photo-sensibility based on the reference exposure and the exposure time.

In other words, the block 15 may be implemented by the third determining module 15. The block 16 may be implemented by the fourth determining module 16.

Therefore, the exposure time and the photo-sensibility of the imaging device 20 may be determined based on the motion information of the foreground part.

It may be understood that, when the foreground is in a moving state, in order to ensure a charity of the foreground part and avoid artifact, the exposure time may be decreased. For maintaining brightness of the foreground part, the photo-sensibility may be increased such that the reference exposure is substantially unchanged. When the foreground part is in a static mode, in order to avoid noise caused by an excessive photo-sensibility, the photo-sensibility may be appropriately decreased and the exposure time may be appropriately increased.

Figure 14:
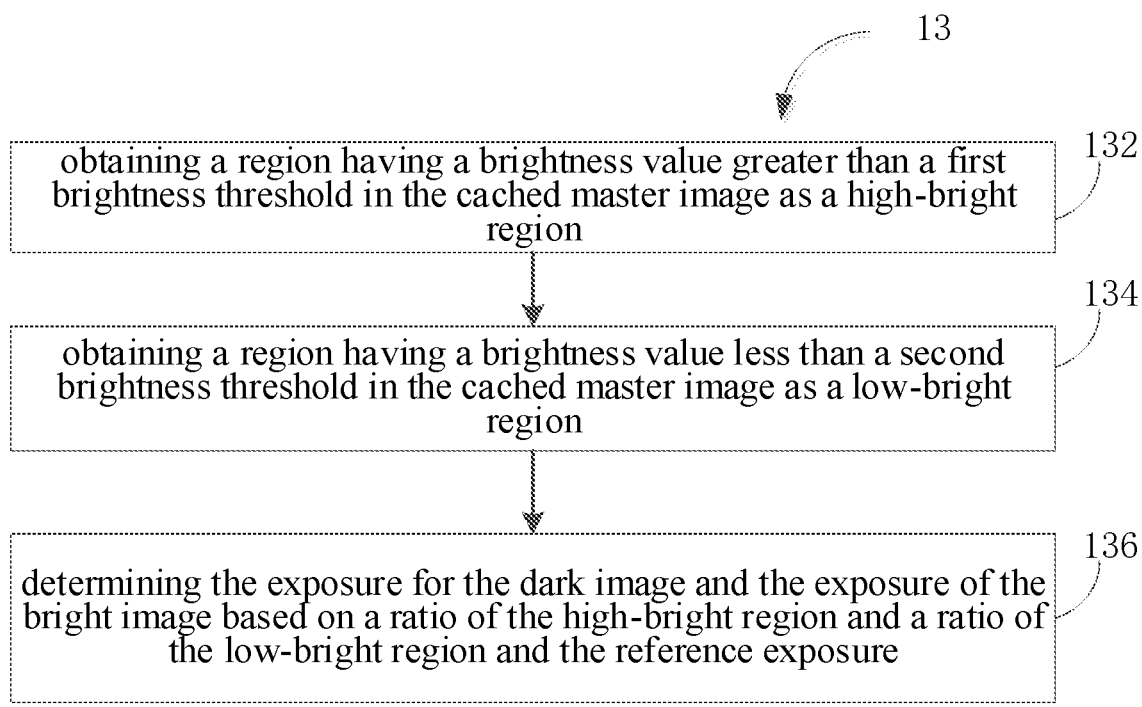
FIG. 14 is a flowchart illustrating an exposure control method according to some implementations of the present disclosure.

As illustrated in FIG. 14, in some implementations, the block 13 may include the following.

At block 132, a region having a brightness value higher than a first brightness threshold in the cached master image is obtained as a high-bright region.

At block 134, a region having a brightness value lower than a second brightness threshold in the cached master image is obtained as a low-bright region. The first brightness threshold is greater than the second bright threshold.

At block 136, the first exposure for the first image and the second exposure for the second image are determined based on a ratio of the high-bright region and a ratio of the low-bright region and the reference exposure.

Figure 15:
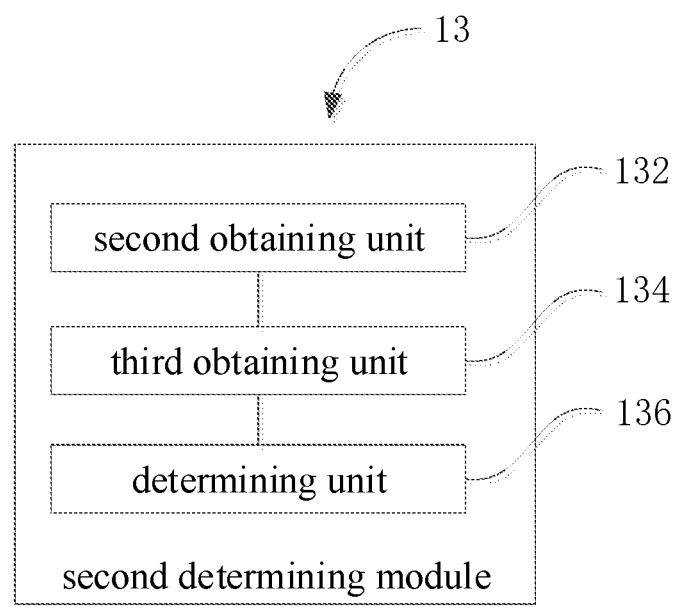
FIG. 15 is a block diagram illustrating a second determining module according to some implementations of the present disclosure.

As illustrated in FIG. 15, in some implementations, the second determining module 13 may include a second obtaining unit 132, a third obtaining unit 134 and a determining unit 136. The second obtaining unit 132 may be configured to obtain a region having a brightness value greater than a first brightness threshold in the cached master image as a high-bright region. The third obtaining unit 134 may be configured to obtain a region having a brightness value less than a second brightness threshold in the cached master image as a low-bright region. The first brightness threshold is greater than the second brightness threshold. The determining unit 136 is configured to determine the first exposure for the first image and the second exposure for the second image based on a ratio of the high-bright region and a ratio of the low-bright region and the reference exposure.

In other words, the block 132 may be implemented by the second obtaining unit 132. The block 134 may be implemented by the third obtaining unit 134. The block 136 may be implemented by the determining unit 136.

Therefore, the first exposure for the first image and the second exposure for the second image may be determined based on the ratio of the high-bright region and the ratio of the low-bright region in the cached master image and the reference exposure.

It may be understood that, the first exposure for the first image may be an exposure for an underexposed image, while the second exposure for the second image may be an exposure for an overexposed image. When the ratio of the high-bright region is larger than the ratio of the low-bright region, it may be indicated that the brightness of the image is high. Therefore, the first exposure for the first image and/or the second exposure for the second image may be reduced appropriately. When the ratio of the low-bright region is higher than the ratio of the high-bright region, it may be indicated that the brightness of the image is low. Therefore, the first exposure for the first image and/or the second exposure for the second image may be appropriately increased. The first exposure for the first image and the second exposure for the second image may be determined appropriately according to actual situations.

In some implementations, the manner of determining the first exposure for the first image and the second exposure for the second image based on the ratio of the high-bright region and the ratio of the low-bright region may include determining the first exposure for the first image and the second exposure for the second image based on a pre-stored ratio of the high-bright region and a pre-stored ratio of the low-bright region. For example, before the electronic device is shipped, the first exposure for the first image and the second exposure for the second image corresponding to the ratio of the high-bright region and the ratio of the low-bright region may be obtained with a large amount of data and experiments. The ratios are stored in the memory of the electronic device 100, such that the first exposure for the first image and the second exposure for the second image may be determined quickly by determining the ratios.

Figure 16:
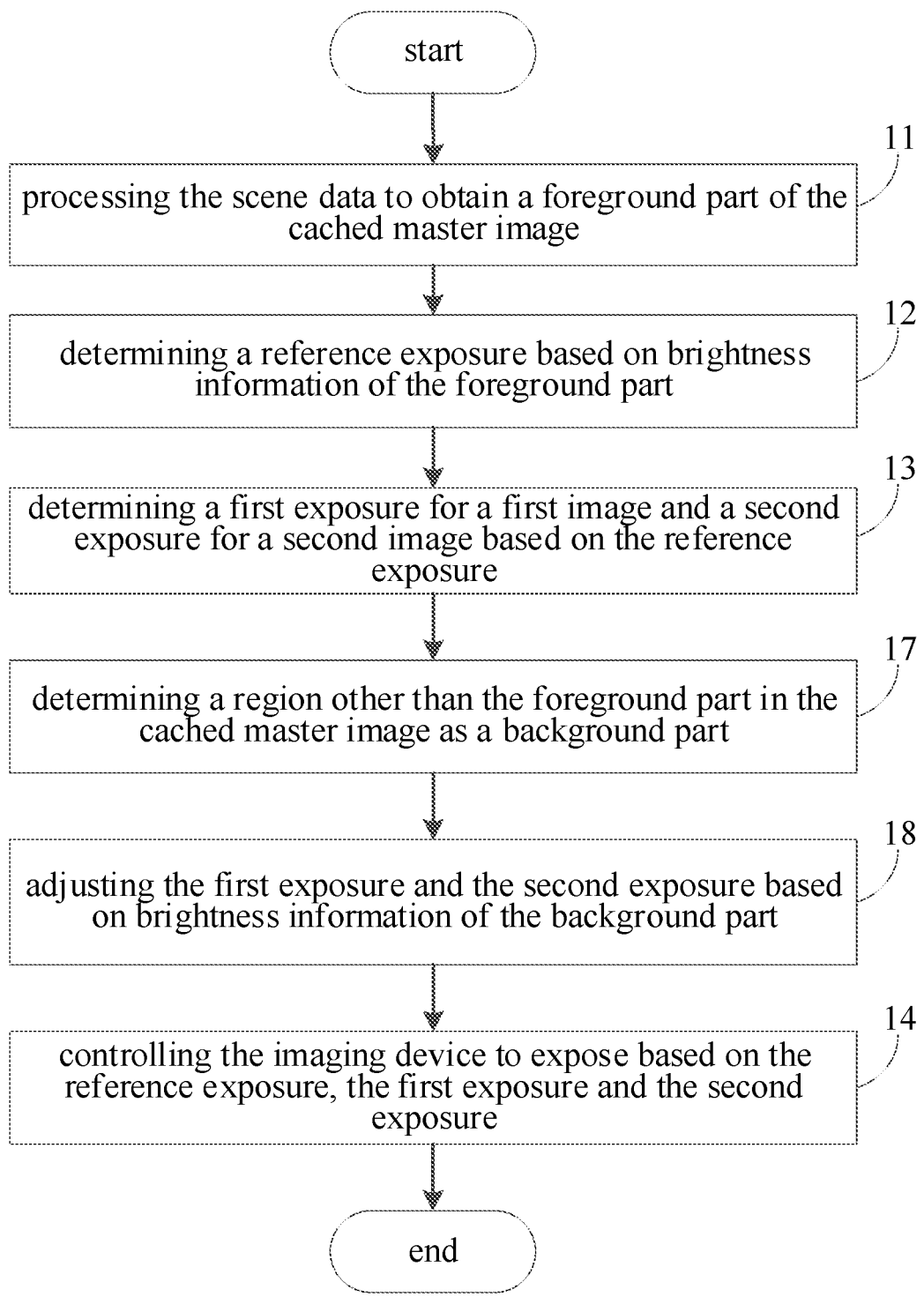
FIG. 16 is a flowchart illustrating an exposure control method according to some implementations of the present disclosure.
Figure 17:
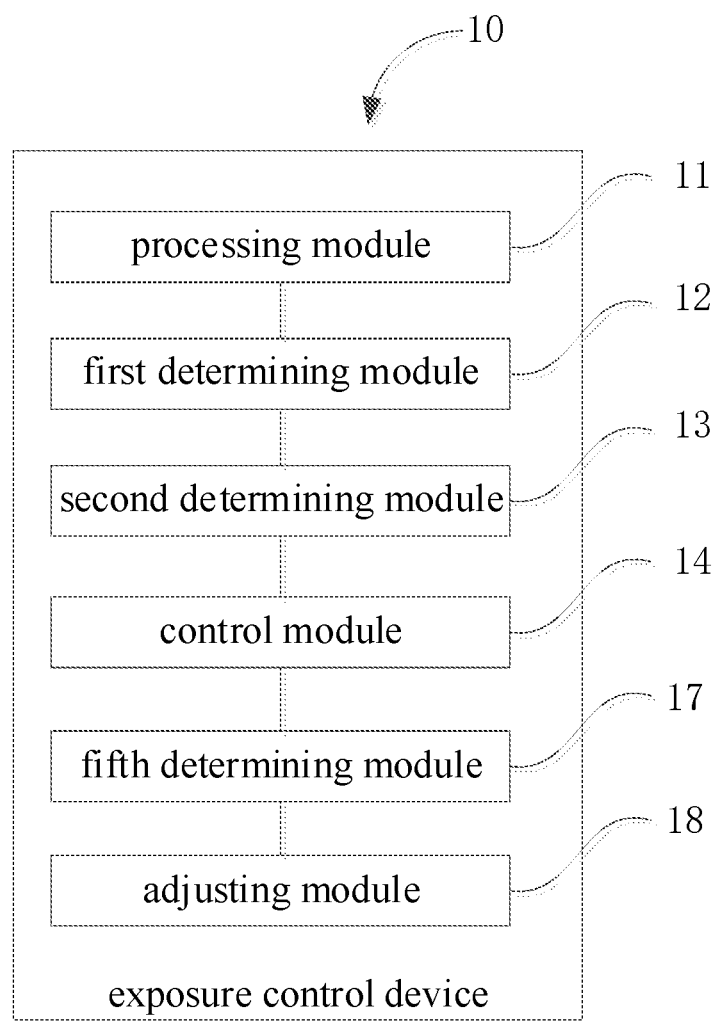
FIG. 17 is another block diagram illustrating an exposure control device according to some implementations of the present disclosure.

As illustrated in FIG. 16, in some implementations, the exposure control method may include the following.

At block 17, a region other than the foreground part in the cached master image is determined as a background part.

At block 18, the first exposure for the first image and the second exposure for the second image are adjusted based on brightness information of the background part.

In some implementations, the exposure control device 10 may include a fifth determining module 17 and an adjusting module 18. The fifth determining module 17 may be configured to determine a region other than the foreground part in the cached master image as a background part. The adjusting module 18 may be configured to adjust the exposure for the dark image and the exposure for the bright image based on brightness information of brightness information of the background part.

In other words, the block 17 may be implemented by the fifth determining module 17. The block 18 may be implemented by the adjusting module 18.

Therefore, the first exposure for the first image and the second exposure for the second image may be adjusted based on the brightness information of the background part.

It may be understood that, since the background part is less significant than the foreground part (i.e., the main object), when a region having a highest brightness or a lowest brightness in the cached master image is within the background part, the first exposure for the first image and the second exposure for the second image may be appropriately adjusted, such that a good contrast of the image captured by the imaging device 20 that is exposed based on the first exposure for the first image and the second exposure for the second image may be obtained. For example, when the region having the lowest brightness in the cached master image is within the background part, the second exposure for the second image may be reduced, such that the contrast of the overexposed image may be appropriate and noise of the background part of the overexposed image may be reduced.

Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections, or may communicate with each other; may also be direct connections or indirect connections via intervening structures; may also be inner communications of two elements or interactions of two elements, which can be understood by those skilled in the art according to specific situations.

Reference throughout this specification to "an embodiment," "some embodiments," "an example," "a specific example," or "some examples," means that a particular feature, structure, material, or characteristic described in connection with the implementations or example is included in at least one implementation or example of the present disclosure. In this specification, exemplary descriptions of aforesaid terms are not necessarily referring to the same implementation or example. Furthermore, the particular features, structures, materials, or characteristics may be combined in any suitable manner in one or more implementations or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A method of exposure control for controlling an imaging device to collect scene data, the scene data comprising a cached master image, the method comprising:

processing the scene data to obtain a foreground part of the cached master image;

determining a value of a reference exposure based on brightness information of the foreground part;

obtaining a region having a brightness value greater than a first brightness threshold in the cached master image as a high-bright region, and obtaining a region having a brightness value less than a second brightness threshold in the cached master image as a low-bright region, the first brightness threshold being greater than the second brightness threshold;

determining a value of a first exposure and a value of a second exposure based on the value of the reference exposure; the value of the first exposure being greater than the value of the reference exposure, and the value of the second exposure being lower than the value of the reference exposure;

in response to determining that an area ratio of the high-bright region to the cached master image is higher than an area ratio of the low-bright region to the cached master image, decreasing at least one of a value of a first exposure or a value or a second exposure;

in response to determining that the area ratio of the high-bright region to the cached master image is lower than the area ratio of the low-bright region to the cached master image, increasing at least one of the value of the first exposure or the value of the second exposure; and controlling the imaging device to expose based on the value of the reference exposure, the value of the first exposure, and the value of the second exposure.

2. The method of claim 1, wherein processing the scene data to obtain the foreground part of the cached master image comprises:

processing the scene data to obtain depth information of the cached master image; and obtaining the foreground part of the cached master image based on the depth information.

3. The method of claim 2, wherein processing the scene data to obtain the depth information of the cached master image comprises:

processing a depth image corresponding to the cached master image to obtain the depth information of the cached master image, in response to determining that the scene data comprises the depth image; or processing the cached master image and a cached slave image corresponding to the cached master image to obtain the depth information of the cached master image, in response to determining that the scene data comprises the cached slave image.

4. The method of claim 2, wherein obtaining the foreground part of the cached master image based on the depth information comprises:

obtaining a foremost point of the cached master image based on the depth information; and finding a region adjacent to the foremost point and having a continuous change in depth as the foreground part or finding a region having a depth difference to the foremost point less than a predetermined threshold as the foreground part.

5. The method of claim 1, wherein the reference exposure comprises an exposure time and a photo-sensibility of the imaging device, and the method comprises:

determining the exposure time based on motion information of the foreground part; and determining a value of the photo-sensibility based on the value of the reference exposure and the exposure time.

6. The method of claim 5, further comprising:
in response to determining that the foreground part is in a moving state, decreasing the exposure time while increasing the value of the photo-sensibility such that the value of the reference exposure is unchanged; and
in response to determining that the foreground part is not in a moving state, increasing the exposure time while decreasing the value of the photo-sensibility such that the value of the reference exposure is unchanged.

7. The method of claim 1, further comprising:
determining the value of the first exposure and the value of the second exposure based on the area ratio of the high-bright region to the cached master image and the area ratio of the low-bright region to the cached master image according to a pre-stored relationship.

8. The method of claim 1, further comprising:
determining a region other than the foreground part in the cached master image as a background part; and
adjusting the value of the first exposure and the value of the second exposure based on brightness information of the background part.

9. A device for exposure control based on depth, for controlling an imaging device to collect scene data, the scene data comprising a cached master image, the device comprising a non-transitory computer-readable medium having computer-executable instructions stored thereon, and an instruction execution system which is configured by the instructions to implement:
a processing module, configured to process the scene data to obtain a foreground part of the cached master image;
a first determining module, configured to determine a value of a reference exposure based on brightness information of the foreground part;
a second obtaining module, configured to obtain a region having a brightness value greater than a first brightness threshold in the cached master image as a high-bright region;
a third obtaining module, configured to obtain a region having a brightness value less than a second brightness threshold in the cached master image as a low-bright region, the first brightness threshold being greater than the second brightness threshold;
a determining module, configured to determine a value of a first exposure and a value of a second exposure based on the value of the reference exposure; the value of the first exposure being greater than the value of the reference exposure, and the value of the second exposure being lower than the value of the reference exposure; wherein, in response to determining that an area ratio of the high-bright region to the cached master image is higher than an area ratio of the low-bright region to the cached master image, decrease at least one of a value of a first exposure or a value of a second exposure, and in response to determining that the area ratio of the high-bright region to the cached master image is lower than the area ratio of the low-bright region to the cached master image, increase at least one of the value of the first exposure or the value of the second exposure; and
a control module, configured to control the imaging device to expose based on the value of the reference exposure, the value of the first exposure, and the value of the second exposure.

10. An electronic device, comprising:
an imaging device, configured to collect scene data, the scene data comprising a cached master image; and
an exposure control device, comprising a non-transitory computer-readable medium having computer-executable instructions stored thereon, and an instruction execution system which is configured by the instructions to implement:
a processing module, configured to process the scene data to obtain a foreground part of the cached master image;
a first determining module, configured to determine a value of a reference exposure based on brightness information of the foreground part;
a second obtaining module, configured to obtain a region having a brightness value greater than a first brightness threshold in the cached master image as a high-bright region;
a third obtaining module, configured to obtain a region having a brightness value less than a second brightness threshold in the cached master image as a low-bright region, the first brightness threshold being greater than the second brightness threshold; and
a determining module, configured to determine a value of a first exposure and a value of a second exposure based on the value of the reference exposure; the value of the first exposure being greater than the value of the reference exposure, and the value of the second exposure being lower than the value of the reference exposure; wherein, in response to determining that an area ratio of the high-bright region to the cached master image is higher than an area ratio the low-bright region to the cached master image, decrease at least one of a value of a first exposure or a value of a second exposure, and in response to determining that the area ratio of the high-bright region to the cached master image is lower than the area ratio of the low-bright region to the cached master image, increase at least one of the value of the first exposure or the value of the second exposure; and
a control module, configured to control the imaging device to expose based on the value of the reference exposure, the value of the first exposure, and the value of the second exposure.

11. The electronic device of claim 10, wherein the processing module comprises:
a processing unit, configured to process the scene data to obtain depth information of the cached master image; and
a first obtaining unit, configured to obtain the foreground part of the cached master image based on the depth information.

12. The electronic device of claim 11, wherein the processing unit is further configured to:
process a depth image corresponding to the cached master image to obtain the depth information of the cached master image, in response to determining that the scene data comprises the depth image; or
process the cached master image and a cached slave image corresponding to the cached master image to obtain the depth information of the cached master image, in response to determining that the scene data comprises the cached slave image.

13. The electronic device of claim 11, wherein the first obtaining unit comprises:
a fifth processing subunit configured to obtain a foremost point of the cached master image based on the depth information and a finding subunit configured to find a region adjacent to the foremost point and having a continuous change in depth as the foreground part or find a region having a depth difference to the foremost point less than a predetermined threshold as the foreground part.

14. The electronic device of claim 10, wherein the reference exposure comprises an exposure time and a photo-sensibility of the imaging device, and the instruction execution system is configured by the instructions to further implement:
- a third determining module, configured to determine the exposure time based on motion information of the foreground part; and
- a fourth determining module, configured to determine a value of the photo-sensibility based on the value of the reference exposure and the exposure time.

15. The electronic device of claim 10, wherein the determining module is further configured to:
determine the value of the first exposure and the value of the second exposure based on the area ratio of the high-bright region to the cached master image and the area ratio of the low-bright region to the cached master image according to a pre-stored relationship.

16. The electronic device of claim 10, wherein the instruction execution system is configured by the instructions to further implement:
- a fifth determining module, configured to determine a region other than the foreground part in the cached master image as a background part; and
- an adjusting module, configured to adjust the value of the first exposure and the value of the second exposure based on brightness information of the background part.

17. The electronic device of claim 10, wherein the imaging device comprises a master camera and a slave camera.

18. The electronic device of claim 10, wherein the imaging device comprises a camera and a projector.

* * * * *